May 4, 1948. A. P. OHR 2,441,078
MACHINE FOR REMOVING BURS FROM GEARS
Filed March 7, 1944 3 Sheets-Sheet 1

Inventor
Albert P. Ohr,
E.W. Anderson Son.
By
Attorneys

May 4, 1948. A. P. OHR 2,441,078
MACHINE FOR REMOVING BURS FROM GEARS
Filed March 7, 1944 3 Sheets-Sheet 2

Inventor
Albert P. Ohr,
By E.W. Anderson & Son.
Attorneys

May 4, 1948.  A. P. OHR  2,441,078
MACHINE FOR REMOVING BURS FROM GEARS
Filed March 7, 1944  3 Sheets-Sheet 3

Inventor
Albert P. Ohr,
E. W. Anderson & Son.
By
Attorneys

Patented May 4, 1948

2,441,078

UNITED STATES PATENT OFFICE 2,441,078

MACHINE FOR REMOVING BURS FROM GEARS

Albert P. Ohr, South Orange, N. J., assignor to Monroe Calculating Machine Company, Orange, N. J., a corporation of Delaware Application March 7, 1944, Serial No. 525,425

8 Claims. (Cl. 90—1.6)

1

The invention relates to machines for removing burs, formed during the process of manufacture, from gears. In a machine having an axially reciprocatory tool gear working and removing burs from between the teeth of a gear to be deburred, burs are to some extent formed on the gear to be deburred by the tool gear itself, and it is an object of the invention to provide the machine with an auxiliary cutting tool engaging and removing burs from a lateral toothed face of a gear to be deburred whereby those burs formed by the one tool are removed by the other tool and vice versa. Another object is to provide such a machine wherein a gear may be inserted in the machine, deburred, and removed from the machine and another gear inserted for deburring without stoppage of the machine. Another object is to provide such a machine wherein a plurality of gears may be inserted, deburred, removed from the machine and other gears inserted for deburring, all seriatim without stoppage of the deburring operation upon those gears still in the machine and without stoppage of the machine. Other objects and advantages will appear hereinafter or will be obvious. The application is a continuation in part of my co-pending application for patent filed March 19, 1943, Serial No. 479,691, and now abandoned.

The invention consists in the novel construction and combination of parts as hereinafter set forth in the claims.

In the accompanying drawings.

Figure 1:
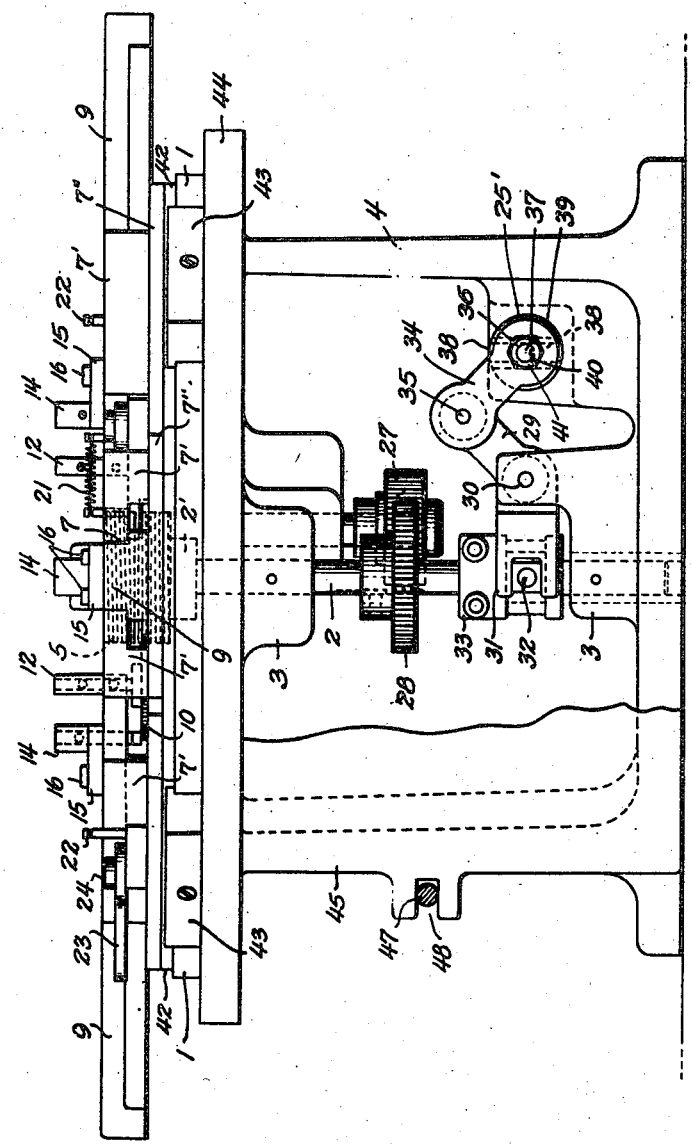
Figure 1 is a side elevation of the invention, partly broken away.
Figure 2:
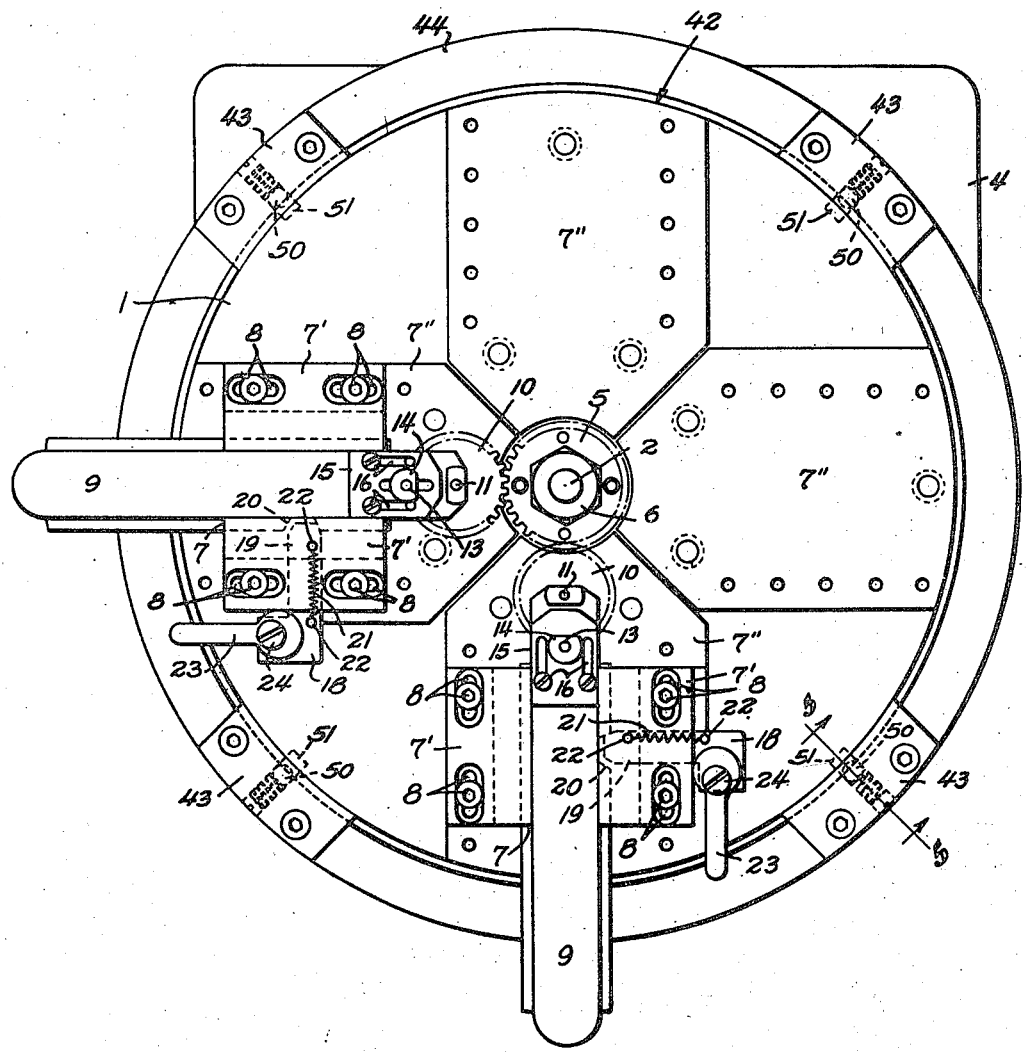
Figure 2 is a top plan view of the invention, with parts removed.
Figure 5:
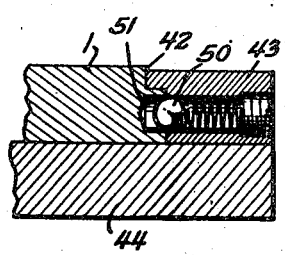
Figure 5 is a detail section on the line 5—5, Figure 2.
Figure 3:
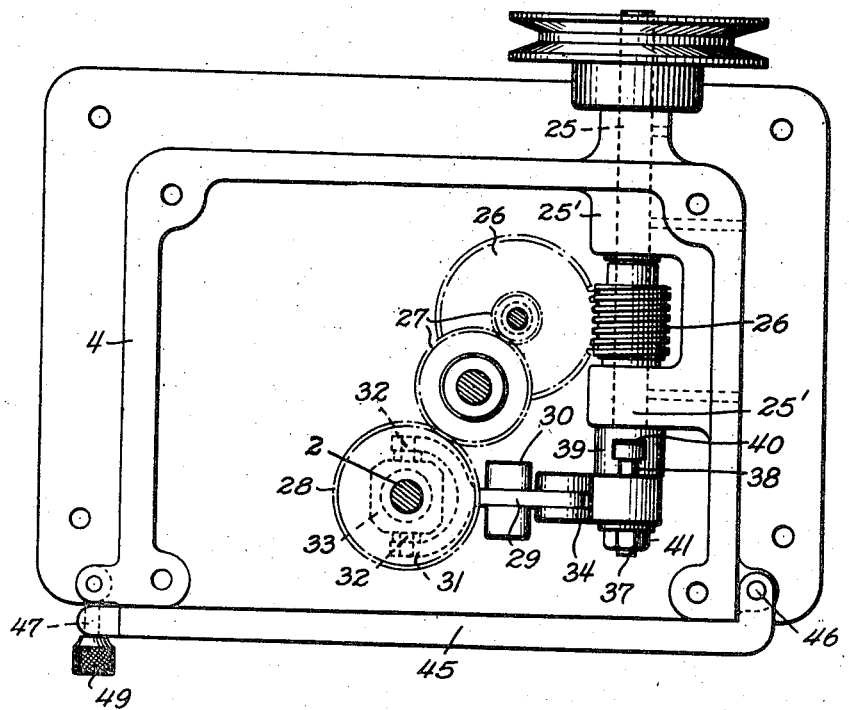
Figure 3 is a top plan view of the mount for the freely rotatable table, the vertical shafts being shown in section.
Figure 4:
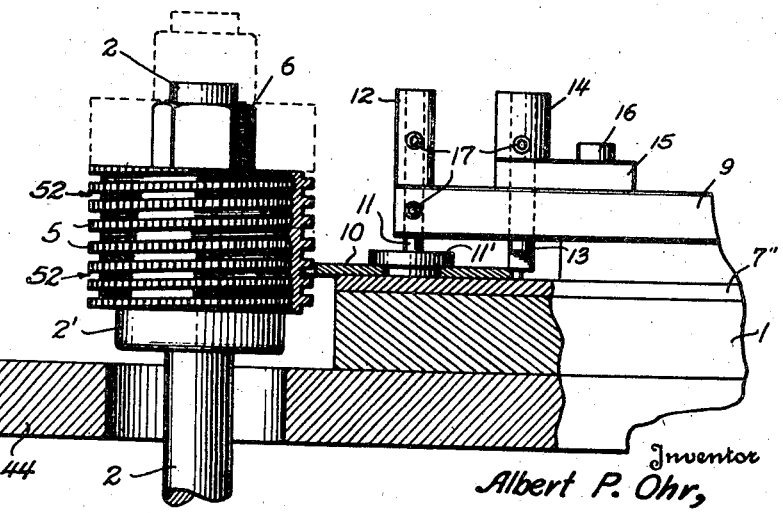
Figure 4 is a detail sectional view, with parts broken away, showing the cutting tool gear, the auxiliary cutting tool, the work and tool holder, and the gear to be deburred.

In these drawings, the numeral 1 designates a horizontal circular table, a shaft 2 being rotatable and axially reciprocable in upper and lower spaced bearings 3 of said table and of the pedestal 4 thereof, said shaft having a collar 2' whereon

2 rests a cutting tool gear 5, a nut 6 being threaded upon the upper free end of said shaft and serving to clamp said cutting tool gear against said collar so that it forms in effect a rigid part of said shaft.

The table 1 is provided with a plurality (four as shown), of radial slideways 7, each comprising two lateral spaced members 7' mounted upon plates 7" secured to the face of said table, said members having adjustable slot and bolt connections 8 with said plates, the latter being provided with tapped holes for the bolts of said connections.

A work and tool holder 9 has removable engagement with each slideway and is adjustable therein radially towards or away from the cutting tool gear 5, each holder having mounted thereon a gear 10 to be deburred, through the medium of a vertical stub shaft 11 engaging a vertical socket 12 of said holder. An auxiliary cutting tool 13 is also mounted upon each holder 9 and is adapted to engage the upper lateral toothed face of a gear to be deburred, the vertical shank of said tool engaging a vertical socket 14 forming part of a supplementary holder 15 having slot and bolt connections 16 with said holder 9 to form in effect a rigid part thereof and provide for separate adjustment with respect to the gear 10 to be deburred. The shank of said auxiliary tool and the stub shaft 11 have slidable engagement with their respective sockets and are fixed in position therein by set screws 17.

Each work and tool holder 9 is provided with means for latching it in position in its slideway as adjusted to mesh the gear to be deburred with the cutting tool gear, comprising a latch 18 engaging a transverse guideway 19 of one of the related members 7', said latch being adapted to engage at its inner end with a beveled seat 20 of a lateral edge of the work and tool holder, said latch being normally held in engagement with said seat by a coiled spring 21 connecting posts 22 one of which forms part of said latch and the other part of the related member 7'. Each latch includes an eccentric 23, pivoted thereto at 24 and bearing against a lateral edge of the related member 7', whereby upon operation of the eccentric the latch is retracted from engagement with said seat and the related work and tool holder may be adjusted in its slideway and the gear to be deburred adjusted into or out of mesh with the cutting tool gear. The eccentric 23 is provided with a handle lever extension whereby it is manually operable.

Each work and tool holder 9 being released by manual operation of its eccentric 23 may be withdrawn from its radial slideway 7. The gear 10 to be deburred may then have its central aperture rotatably engaged with a lower enlargement of the stub shaft 11, which latter is provided with a lower collar 11' against which the upper face of the gear 10 may bear, said gear resting upon the upper face of the related plate 7" and in its rotation working between said parts 11' and 7". A gear having been deburred, its work and tool holder 9 is released and withdrawn from its slideway as aforesaid, the gear removed and a new gear to be deburred engaged with said stub shaft, whereupon the work and tool holder is reinserted in its slideway and the related eccentric 23 manually operated to hold the work or gear 10 engaged with the cutting tool gear and the auxiliary cutting tool. As each gear 10 is deburred, the table 1 is manually adjusted ninety degrees or one quarter around and the stated procedure repeated, the deburring operation upon the other gears 10 still in the machine not being interrupted during this ninety degree adjustment.

Four gears to be deburred are inserted one after another in the machine and the table 1 given a ninety degree manual adjustment after each such insertion without stoppage of the deburring operation, and as the table is given a fourth ninety degree adjustment, the first gear so inserted will have become deburred and be brought opposite the operator servicing the machine for removal and replacement with another gear to be deburred, the stated operation being continuous. Thus the capacity of the machine is increased and time is saved.

The gears to be deburred are adapted to have meshing engagement with the cutting tool gear in such wise that axial reciprocation and simultaneous rotation of the cutting tool gear will remove the burs formed on the gears during the process of manufacture, and those burs formed on the gears by the cutting tool gear will be removed by the auxiliary cutting tool and vice versa.

Means are provided and described as follows for axially reciprocating the tool gear and for simultaneously rotating the tool gear and the gear to be deburred.

A drive shaft 25 has rotary bearings 25' in the pedestal or mount 4, and worm gear connection 26, through the medium of mesh gears 27, with a gear 28 fast upon the shaft 2 whereon said tool gear is mounted. A lever 29 is fulcrumed upon the pedestal 4 at 30, one arm of said lever having a forked free end 31 engaging opposite projections 32 of a collar 33 fast upon said shaft 2 with respect to axial movement but within which the shaft 2 is freely rotatable. A link 34 has at one end thereof pivotal connection 35 with the free end of the other arm of said lever 29, said link at the other end thereof being pivoted at 36 upon a bolt 37, which bolt adjustably engages a diametric slot 38 of the head 39 of said drive shaft, adjustment of the bolt within said slot serving to vary the eccentricity of the bolt with respect to said drive shaft to vary accordingly the length of the reciprocatory stroke imparted to the vertical shaft 2 during rotation of said drive shaft. Thus the drive shaft being rotated, the eccentric bolt 37 thereof will through the medium of the link 34 impart a short oscillatory movement to the lever 29, which latter will axially reciprocate the vertical shaft 2. The bolt 37 is provided with a retaining head engaging a diametric enlargement 40 of said slot, and with a nut 41 threaded upon its outer end.

The horizontal freely rotatable table 1 has circumferential edge bearings 42 in four upwardly projecting blocks 43 spaced ninety degrees apart and bolted to and forming a rigid part of a stationary annulus 44, suitable bolts clamping said annulus down to the pedestal or mount 4. This pedestal is in the form of a boxing for the working parts beneath the table 1, and is provided with a door 45 hinged at one edge thereof at 46 and at the opposite edge having a pivoted bolt 47 engaging an open end slot 48 of said boxing, said bolt being provided with a nut 49 threaded thereon to hold the door securely closed. This door being opened, the working parts beneath the table are accessible for repair, replacement, etc. The blocks 43 are provided each with a spring-pressed yieldable locator click 50 engaging a circumferential shallow notch 51 of said table, the four clicks being spaced ninety degrees apart. Thus the table 1, while freely rotatable will be stopped and yieldably held or located upon each ninety degree adjustment thereof.

The deburring gear 5 is provided with a narrow spiral groove 52 of slight inclination with respect to its longitudinal axis, thereby providing a plurality of annular deburring edges the number of which will vary in accord with the number of times the spiral groove circles the gear. In order to take full advantage of the increased number of deburring edges so provided for this gear, the stroke of the deburring gear should be long enough to bring all of these deburring edges into play. Due to the fact that the spiral groove is angularly disposed with respect to the longitudinal axis of the gear to be deburred, a narrow gear to be deburred would remain meshed with the deburring gear, whereas with a right angle disposed groove the mesh might be lost. The interval between the upper and lower cutting faces of each annular groove element of the spiral groove 52 may be less than the width of the gear 10 to be worked.

In giving the freely rotatable table 1 a ninety degree adjustment following the removal of a deburred gear and insertion of a gear to be deburred, the operator servicing the machine finds it convenient to grasp one of the work and tool holders 9 which project radially of the machine outwardly from the stationary annulus 44.

I claim:

1. A machine of the character described, comprising a vertical shaft, a horizontal support, a plurality of work and tool holders resting upon said support and each adapted to have mounted thereon a gear to be deburred, an auxiliary cutting tool mounted upon each said holder and adapted to engage a lateral toothed face of the related gear to be deburred, a cutting tool gear mounted upon said shaft and adapted to have meshing engagement with all of the gears to be deburred, and means for axially reciprocating the tool gear and for simultaneously rotating the tool gear and all of the gears to be deburred, said horizontal support being freely rotatable relative to said shaft as a center to present the tool and work holders seriatim to an operator servicing the machine and said holders being each adjustable radially of said tool gear to adjust the gear to be deburred into and out of mash therewith and each removable for removal of a deburred gear and insertion of another gear to be deburred without stoppage of the deburring operation upon the other gears and without stoppage of the machine.

2. A machine of the character described, comprising a vertical shaft, a horizontal support having a plurality of slideways radial of said shaft, a work and tool holder adjustable in each slideway and adapted to have mounted thereon a gear to be deburred, an auxiliary cutting tool mounted upon each holder and adapted to engage a lateral toothed face of the related gear to be deburred, a cutting tool gear mounted upon said shaft and adapted to have meshing engagement with all of the gears to be deburred, means for latching each tool holder in position in its slideway, and means for axially reciprocating the tool gear and for simultaneously rotating the tool gear and all of the gears to be deburred, said horizontal support being freely rotatable relative to said shaft as a center to present the work and tool holders seriatim to an operator servicing the machine and said holders being each adjustable radially of said tool gear to adjust the gear to be deburred into and out of mesh therewith and each removable for removal of a deburred gear and insertion of another gear to be deburred without stoppage of the deburring operation upon the other gears and without stoppage of the machine.

3. A machine for removing burs from gears, comprising a table, a work holder resting upon said table, a work gear rotatably mounted upon said holder, a vertical shaft, a tool gear upon said shaft having meshing engagement with the work gear, and means for axially reciprocating said tool gear and for simultaneously rotating the tool gear and the work gear, said holder being adjustable upon said table to adjust the work gear into and out of mesh with the tool gear, the mount of the work gear upon said holder having means for removable engagement with the work gear for release of the same following deburral and replacement by another gear to be worked, said holder and the work gear mounted thereon forming a single unit movable as an entirety upon said table.

4. A machine for removing burs from gears, comprising a table, a work holder upon said table, a work gear rotatably mounted upon said holder, a vertical shaft, a tool gear upon said shaft, having meshing engagement with the work gear, and means for axially reciprocating said tool gear and for simultaneously rotating the tool gear and the work gear, said tool gear having a circumferential annular groove extending through its teeth and provided with upper and lower spaced annular deburring faces, the reciprocation of the tool gear being sufficient to move both of said annular deburring faces completely through the teeth of the work gear, said holder being adjustable upon said table to adjust the work gear into and out of mesh with the tool gear, the mount of the work gear upon said holder having means of removable engagement with the work gear for release of the same following deburral and replacement by another gear to be worked, said holder and the work gear mounted thereon forming a single unit movable as an entirety upon said table.

5. A machine for deburring gears, comprising a table, a work holder upon said table, a work gear rotatably mounted upon said holder, a vertical shaft, a tool gear upon said shaft having meshing engagement with the work gear, and means for axially reciprocating said tool gear and for simultaneously rotating the tool gear and the work gear, said tool gear having a circumferential spiral groove extending through its teeth and each annular element of which is provided with upper and lower spaced annular deburring faces, the reciprocation of the tool gear being sufficient to move both annular deburring faces of a plurality of annular elements of said spiral groove completely through the teeth of the work gear, said spiral groove tending to cause a narrow work gear to remain meshed with the tool gear, said holder being adjustable upon said table to adjust the work gear into and out of mesh with the tool gear, the mount of the work gear upon said holder having means of removable engagement with the work gear for release of the same following deburral and replacement by another gear to be worked, said holder and the work gear mounted thereon being a single unit movable as an entirety upon said table.

6. A machine for removing burs from gears, comprising a table, a work holder upon said table, a work gear rotatably mounted upon said holder, an auxiliary tool mounted upon said holder engaging the upper lateral toothed edge of said work gear, a vertical shaft, a tool gear upon said shaft having meshing engagement with the work gear, and means for axially reciprocating said tool gear and for simultaneously rotating the tool gear and the work gear, said holder being adjustable upon said table to adjust the work gear into and out of mesh with the tool gear, the mount of the work gear upon said holder having means of removable engagement with the work gear for release of the same after deburral and replacement by another gear to be worked, the mount of the auxiliary tool upon said holder having means for adjusting the auxiliary tool with respect to the work gear, said holder and the work gear and the auxiliary tool mounted thereon being a single unit movable as an entirety upon said table.

7. A machine for removing burs from gears, comprising a table, having a slideway, a work holder in said slideway, a work gear rotatably mounted upon said holder, a vertical shaft, a tool gear upon said shaft having meshing engagement with the work gear, means for latching said holder in fixed position in said slideway, and means for axially reciprocating said tool gear and for simultaneously rotating the tool gear and the work gear, said holder being adjustable in said slideway to adjust the work gear into and out of mesh with the tool gear, the mount of the work gear upon said holder having means of removable engagement with the work gear for release of the same following deburral and replacement by another gear to be worked, said holder and the work gear mounted thereon being a single unit movable as an entirety in said slideway.

8. A machine for removing burs from gears, comprising a table having a slideway, a work holder in said slideway, a work gear rotatably mounted upon said holder, an auxiliary tool mounted upon said holder engaging the upper lateral toothed edge of said work gear, a vertical shaft, a tool gear upon said shaft having meshing engagement with the work gear, means for axially reciprocating said tool gear and for simultaneously rotating the tool gear and the work gear, said holder being adjustable in said slideway to adjust the work gear into and out of mesh with the tool gear and means for latching said holder in fixed position in said slideway, the mount of the work gear upon said holder having means of removable engagement with the work gear for release of the same after deburral and replacement by another gear to be worked, the mount of the auxiliary tool upon said holder having means for adjusting the auxiliary tool with respect to the work gear, said holder and the work gear and the auxiliary tool mounted thereon being a single unit movable as an entirety in said slideway.

ALBERT P. OHR.

REFERENCES CITED

The following references are of record in the file of this patent:

UNITED STATES PATENTS

| Number | Name | Date |
| --- | --- | --- |
| 1,505,420 | Peterson | Aug. 19, 1924 |
| 1,749,704 | Hoke | Mar. 4, 1930 |
| 1,989,651 | Drummond | Jan. 29, 1935 |
| 2,123,026 | Simmons | July 5, 1938 |
| 2,137,146 | Simmons | Nov. 15, 1938 |
| 2,206,450 | Christman | July 2, 1940 |
| 2,352,557 | Miller | June 27, 1944 |